(12) United States Patent
Eshkoli et al.

(10) Patent No.: US 7,679,640 B2
(45) Date of Patent: *Mar. 16, 2010

(54) METHOD AND SYSTEM FOR CONDUCTING A SUB-VIDEOCONFERENCE FROM A MAIN VIDEOCONFERENCE

(75) Inventors: Noam Eshkoli, Tel Mond (IL); Niv Wagner, Rechovot (IL)

(73) Assignee: Polycom, Inc., Pleasanton, CA (US)

( * ) Notice: Subject to any disclaimer, the term of this patent is extended or adjusted under 35 U.S.C. 154(b) by 1225 days.

This patent is subject to a terminal disclaimer.

(21) Appl. No.: 11/045,396

(22) Filed: Jan. 27, 2005

(65) Prior Publication Data

US 2006/0164507 A1 Jul. 27, 2006

(51) Int. Cl.
*H04N 7/14* (2006.01)
*G06F 3/00* (2006.01)

(52) U.S. Cl. ............... 348/14.09; 348/14.08; 348/14.07

(58) Field of Classification Search ... 348/14.01–14.09, 348/14.1, 14.11, 14.12, 14.13, 14.14; 379/202.01, 379/204.01; 715/753
See application file for complete search history.

(56) References Cited

U.S. PATENT DOCUMENTS

| 5,619,555 | A | * | 4/1997 | Fenton et al. ............. 379/88.11 |
| 5,949,414 | A | * | 9/1999 | Namikata et al. ........... 715/753 |
| 6,138,144 | A | | 10/2000 | DeSimone et al. |
| 6,300,973 | B1 | | 10/2001 | Feder et al. ............... 348/14.09 |
| 6,404,873 | B1 | * | 6/2002 | Beyda et al. ........... 379/202.01 |
| 6,608,636 | B1 | * | 8/2003 | Roseman ..................... 715/753 |
| 6,760,750 | B1 | | 7/2004 | Boneh et al. ................ 709/204 |
| 7,412,392 | B1 | | 8/2008 | Satapathy |
| 2002/0159394 | A1 | | 10/2002 | Decker et al. ............... 370/252 |
| 2002/0188731 | A1 | | 12/2002 | Potekhin et al. ............. 709/277 |
| 2003/0105820 | A1 | | 6/2003 | Haims et al. |
| 2003/0174202 | A1 | | 9/2003 | Eshkoli et al. ........... 348/14.08 |
| 2004/0008635 | A1 | * | 1/2004 | Nelson et al. ............... 370/260 |

FOREIGN PATENT DOCUMENTS

| JP | 05-037933 | * | 2/1993 |
| JP | 09-219749 | * | 8/1997 |
| WO | WO0215556 | | 2/2002 |

OTHER PUBLICATIONS

U.S. Appl. No. 10/960,337, filed Oct. 7, 2004, Decker et al.
Office Action dated Feb. 28, 2009 for U.S. Appl. No. 11/045,565.
Response to Office Action submitted May 27, 2008 U.S. Appl. No. 11/045,565.
Final Office Action dated Aug. 22, 2008 for U.S. Appl. No. 11/045,565.
Response to Office Action submitted Oct. 24, 2008 for U.S. Appl. No. 11/045,565.

* cited by examiner

*Primary Examiner*—Melur Ramakrishnaiah
(74) *Attorney, Agent, or Firm*—Wong, Cabello, Lutsch, Rutherford & Brucculeri, LLP

(57) ABSTRACT

New videoconferencing services and methods for handling the video and audio of one or more sub-conferences running in parallel to a main videoconference are disclosed. In exemplary embodiment, a multipoint control unit (MCU) that controls one or more videoconferences may be requested by a conferee of a videoconference (a main videoconference) to establish a sub-conference according to a requester mode of operation.

44 Claims, 8 Drawing Sheets

METHOD AND SYSTEM FOR CONDUCTING A SUB-VIDEOCONFERENCE FROM A MAIN VIDEOCONFERENCE

CROSS-REFERENCE TO RELATED APPLICATIONS

This application is filed concurrently with U.S. patent application having Express Mail No. EV 468040919 US, and entitled "Method and System for Allowing Video Conferee to Choose Between Various Associated Videoconferences."

FIELD OF THE INVENTION

The present invention relates to the field of videoconferencing services.

BACKGROUND

Companies and organizations increasingly use videoconferencing to reduce traveling expenses and to save time. To create a satisfactory videoconference, a videoconferencing system has to emulate what participants would expect during a regular, face-to-face meeting with other participants, including the ability to have sub-conference with a particular subset of the participants.

In one example, participants of a face-to-face meeting in a business environment may belong to different groups, organizations, etc. During the meeting, the participants of one group may wish to privately discuss certain issues among themselves as a sub-conference while the main meeting is still ongoing. In another example, a lecturer in an educational environment may wish to present material to an entire class of students while having a private session with one or more of the students.

Unfortunately, current videoconferencing systems only allow a participant to conduct a single videoconference because a common videoconference endpoint cannot participate in two or more videoconferences (video sessions) simultaneously. Therefore, participants that would like to have a private session (e.g., a sub-conference) while the main videoconference is still ongoing are required to use an outside communication source, such as a telephone, a cellular telephone, Short Message System (SMS) messaging, etc.

As is known in the art, a videoconferencing endpoint is a terminal on a network. The endpoint is capable of providing real-time, two-way audio and visual communication with other endpoints or a multipoint control unit (MCU). A multimedia endpoint may provide audio and video, or audio, video, and data. An MCU is a videoconference controlling entity typically located in a node of the network. The MCU receives several channels from access ports, processes audiovisual signals according to certain criteria, and distributes the audiovisual signals to the connected channels. The information communicated between the endpoints and the MCU includes control signals, indicators, audio, video, and/or data. An example of an MCU is the MGC-100, which is available from Polycom Inc., the assignee of the present disclosure. Additional information about the MCG-100 can be found at the website of www.polycom.com. Additional information on an endpoint (terminal) and an MCU can be found in the International Telecommunication Union ("ITU") standards H.320, H.321, and H.323.

U.S. patent application Ser. No. 10/144,561, which is incorporated herein by reference in its entirety, discloses a system and a method for conducting a private audio session during a main audio or videoconference. However, this application does not allow a participant to conduct a private video session during a main videoconference. Furthermore, a need exists for a videoconferencing system that allows a participant to invite some participants to a sub-conference without informing all participants of the main videoconference.

SUMMARY OF THE DISCLOSURE

New videoconferencing services and methods for handling the video of one or more sub-conferences running in parallel to a main videoconference are disclosed. In exemplary embodiments, a multipoint control unit (MCU) that controls one or more videoconferences may be requested by a conferee of a videoconference (a main videoconference) to establish a sub-conference.

A conferee of an ongoing videoconference, who wishes to set a private video session with one or more conferees, may request the MCU to establish the sub-conference, such as by using DTMF signals with or without an IVR session, or Far End Camera Control (FECC). Other exemplary embodiments may use a click and view technique ("video commander") to control the MCU. The click and view technique is disclosed in a U.S. patent application Ser. No. 10/346,306, which incorporated herein by reference in its entirety. Other exemplary embodiments of the present invention may use out of band comments in order to invite one or more parties to the sub-conference.

Using the menu of the click and view technique, a participant (e.g., the requester of the sub-conference) can select a sub-conference option. Upon receiving a request to a sub-conference, the MCU may send a sub-conference menu. The sub-conference menu may include a list of the current conferees in the main videoconference, from which the requester of the sub-conference may select the conferees that she/he wishes to invite to the sub-conference. In response, the MCU, by using click and view functionality, may send an invitation to the invited conferees. The invitation may include information on the requester, those invited to the sub-conference, the subject of the sub-conference, etc. In addition, the invitation may include two soft keys for either accepting or denying the invitation.

Upon receiving the response of the selected conferees, a second menu may be sent and be displayed on the screen of the requester to allow the requester to select one or more layouts to be used for the sub-conference. The different layouts illustrate the different options available to display the main videoconference and the sub-conference in two sections of the video screen belongs to a sub-conference participant's endpoint.

After defining the sub-conference participants and the layout of the sub-conference, the control module of MCU may set the video module and the audio module that are associated with the sub-conference conferees according to the parameters of the sub-conference. In addition, when using click and view techniques, the menu displayed over the screen of the sub-conference conferee's endpoint may include soft keys for controlling the sub-conference. Exemplary soft keys may add a conferee, remove a conferee, return to the main videoconference, etc.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Embodiments of the invention will be more readily understood from reading the following description and by reference to the accompanying drawings, in which.

DETAILED DESCRIPTION

Figure 1:
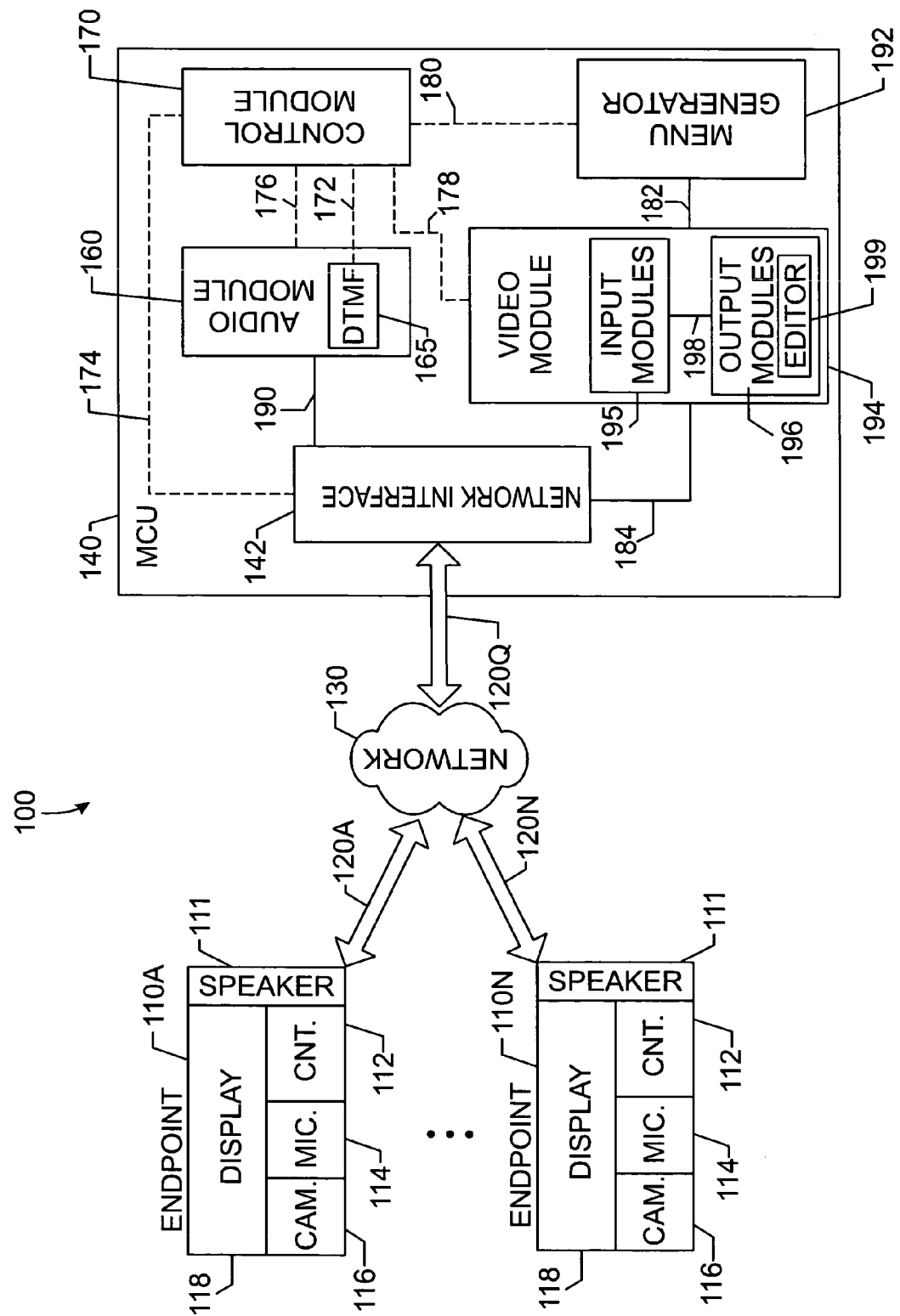
FIG. 1 schematically illustrates an embodiment of a videoconferencing system operating according to an embodiment of the present disclosure.

FIG. 1 schematically illustrates an embodiment of a videoconferencing system 100 having a plurality of endpoints 110A-N, multimedia lines 120A-N, a network 130, and a Multipoint Control Unit (MCU) 140. FIG. 1 shows a typical videoconference environment in which the MCU 140 can be used. However, alternative embodiments of the system 100 may include other components and/or may not include all of the components shown in FIG. 1. Some components of the videoconferencing system 100 are well known in the art and are only briefly described herein.

Any combination of endpoints 110A-N can participate in any given videoconference controlled by the MCU 140. The endpoints 110A-N can provide speech, data, video, or any combination thereof. Accordingly, each endpoint 110A-N can have a speaker 111, a user control device 112, a microphone 114, a camera 116, a display screen 118, a multimedia line 120, or any combination of these components. Examples of endpoints 110 include a regular telephone, an IP Phone, a cellular (with or without a camera), but more commonly would comprise a multimedia endpoint like a Polycom View Station, etc. Details of the speaker 111, microphone 114, camera 116, and display 118 of the endpoints 110A-N are known in the art.

For implementing an exemplary embodiment of the present invention, the control device 112 provides an interface between a user at the endpoint 110 and the MCU 140. Accordingly, the control device 112 can be any number of known devices for the user to send control signals. For example, the control device 112 can be a remote controller of the endpoint 110A-N, a dialing keyboard (e.g., the keypad of a telephone) that uses DTMF signals, a dedicated control device that uses other control signals in addition to DTMF signals, or a far-end camera control signaling unit according to standards H.224 and H.281. In addition, the control device 112 can be a conventional keypad having navigation keys or can be software presenting a virtual keypad on the display 118 of the endpoint 110A-N.

The multimedia lines 120A-N convey information between the endpoints 110A-N and the network 130, and the multimedia line 120Q conveys information between the network 130 and the MCU 140. The information communicated between the endpoints 110A-N and the MCU 140 includes control signals, indicators, audio information, video information, and data.

The MCU 140 includes a network interface 142, an audio module 160, a control module 170, a menu generator 192, and a video module 194. The network interface 142 receives the multimedia communication from the endpoints 110A-N via the network 130 and processes the multimedia communication according to communication standards such as, but not limited to, H.323, H.320, H.321, H.324, H.261, H.263, H.264, and/or Session Initiation Protocol (SIP), and/or H.320. (More information concerning communications between endpoints and/or MCUs over different networks, and information describing signaling, control, compression, and how to set a video call, for example, can be found in the International Telecommunication Union ("ITU") standards H.320, H.321, H.323, H.261, H.263 and H.264, which are incorporated herein by reference in their entireties). The audio module 160 has a DTMF module 165 for detecting and deciphering DTMF tones from a user's endpoint.

The video module 194 has input modules 195, output modules 196, and a common interface 198. Each of the output modules 196 may have an editor 199. As the details and functionality of the various components of an MCU are well known in the art, they are not described in exhaustive detail herein. However, the reader desiring a better understanding of such details may wish to consult U.S. patent application Ser. No. 10/144,561, which is incorporated herein by reference in its entirety. Exemplary operation of a suitable video module 194 and other details regarding MCUs are described in U.S. Pat. No. 6,300,973, U.S. Provisional Patent Application Ser. No. 60/225,491, and International Application Ser. No. PCT/IL01/00757, the content of which are incorporated herein by reference in their entireties. An exemplary editor 199 is disclosed in the above-incorporated U.S. Pat. No. 6,300,973.

The control module 170 essentially controls the operation of the MCU 140, and in particular includes logic modules that process instructions from the DTMF module 165 sent via the control line 172. The control module 170 further includes logic modules that process other dedicated control signals sent via the control line 174. The control module 170 controls the audio module 160 via control line 176, the menu generator 192 via control line 180, and the video module 194 via control line 182.

The menu generator 192 generates menu frames for the system 100. To do this, the menu generator 192 receives commands from the control module 170 and generates menu frames with relevant options for selection by the user. Details concerning these menu frames are provided later in the present disclosure, but briefly, menu frames are graphical images having a size and format that the video module 194 is capable of handling for displayed on the displays 118 of the endpoints 110A-N. The menu frames can include textual and/or graphical information and can be displayed in addition to, or instead of, part of the common video image of the videoconference, which is typically the video image of the participants. The menu frames can also include transparent information where the video image of the videoconference can be seen as background through a partially transparent foreground image.

In one embodiment, the menu generator 192 is a part of the video module 194. In other embodiments, the menu generator 192 is a separate unit or module that generates menus for more than one of the output modules 196, or comprises a module for each of the output modules 196 to generating individualized menus requested by each endpoints associated with a given output module 196. When the menu frames can be individualized for each of the endpoints 110A-N, the menu frames can vary in their setup and appearance according to the requests of the individual endpoints 110A-N. Alternatively, the appearance of the menu frames can be essentially uniform, but the menu frames can be individualized in terms of when the menu frames are sent to a particular endpoint and what features have been selected.

As noted earlier, the system 100 is capable of operating so that a participant can participate in two or more videoconferences simultaneously. In a first, "requester mode" of operation, a participant of the videoconference is capable of initiating or requesting a private discussion (i.e., a sub-conference) with one or more other participants while the main videoconference is still ongoing. In turn, the other participants invited to participate have the option of joining the sub-conference. In a second, "traveler mode" of operation, a particular participant ("a traveler") is capable of "traveling," or selecting, between two or more associated videoconferences.

In one embodiment of the system 100, a moderator or administrator can set up these modes of operation, for example, while reserving the videoconference and/or defining the profile of the videoconference. The moderator can be associated with one of the endpoints 110A-N, or can comprise a separate terminal (not shown). Either way, the moderator can use his control device 112 to make the selections and otherwise define the profile of the videoconference. For example, the moderator can determine whether a particular participant will have the ability to request a sub-conference (using their respective control devices 112) during the videoconference or whether a particular participant will have the ability to select between two or more associated videoconferences. In another embodiment of the system 100, the moderator or administrator can configure the MCU 140 so that certain dial-in numbers allow some participants to use the above modes of operation while others cannot.

As noted above, the requester mode of operation allows a participant to initiate or request a sub-conference with other participants while the main videoconference is still ongoing. In this mode, the control module 170 of the MCU 140 checks the videoconference profile when initiating the videoconference and determines whether a sub-conference option exists. Assuming that option exists, when a participant requests a sub-conference, as described further below with reference to FIG. 2, the menu generator 192 generates a sub-conference menu frame. The control module 170 then instructs the appropriate output module 196 in the video module 194 to add the sub-conference menu frame from the generator 192 as one of the video sources to be sent to the requester's endpoint 110. Exemplary sub-conference menu screens for requesting and establishing a sub-conference are described further below with reference to FIGS. 3A-3E and 4A-4C. Using the sub-conference menu screens and the control device 112 at their endpoint 110, the requester sets-up the sub-conference and sends the information to the MCU 140. Subsequently, the MCU 140 receives the information from the endpoint 110 and controls operation of the system 100 to conduct the sub-conference while the main videoconference is ongoing.

In the traveler mode of operation, a traveler can select between two or more associated videoconferences. In this mode, the control module 170 checks the videoconference profile when initiating the videoconference and determines whether a traveler option exists. If the option exists, two or more videoconference are associated together, and one or more participants are designated as travelers capable of selecting between the associated videoconferences. An embodiment of a method for selecting between associated videoconferences is described below with reference to FIGS. 5A-5B. When a participant of the videoconferences is a traveler, the menu generator 192 generates a traveler menu frame. The control module 170 instructs the appropriate output modules 196 in the video module 194 to add the traveler menu frame from the generator 192 as one of the video sources to be sent to the traveler's endpoint 110. Exemplary traveler menu screens are discussed below with reference to FIGS. 6A-6B. Using the traveler menu screens and the control device 112 at their endpoint 110, the traveler makes selections that are received by the MCU 140 to control operation of the system 100 according to the traveler's selections.

Figure 2:
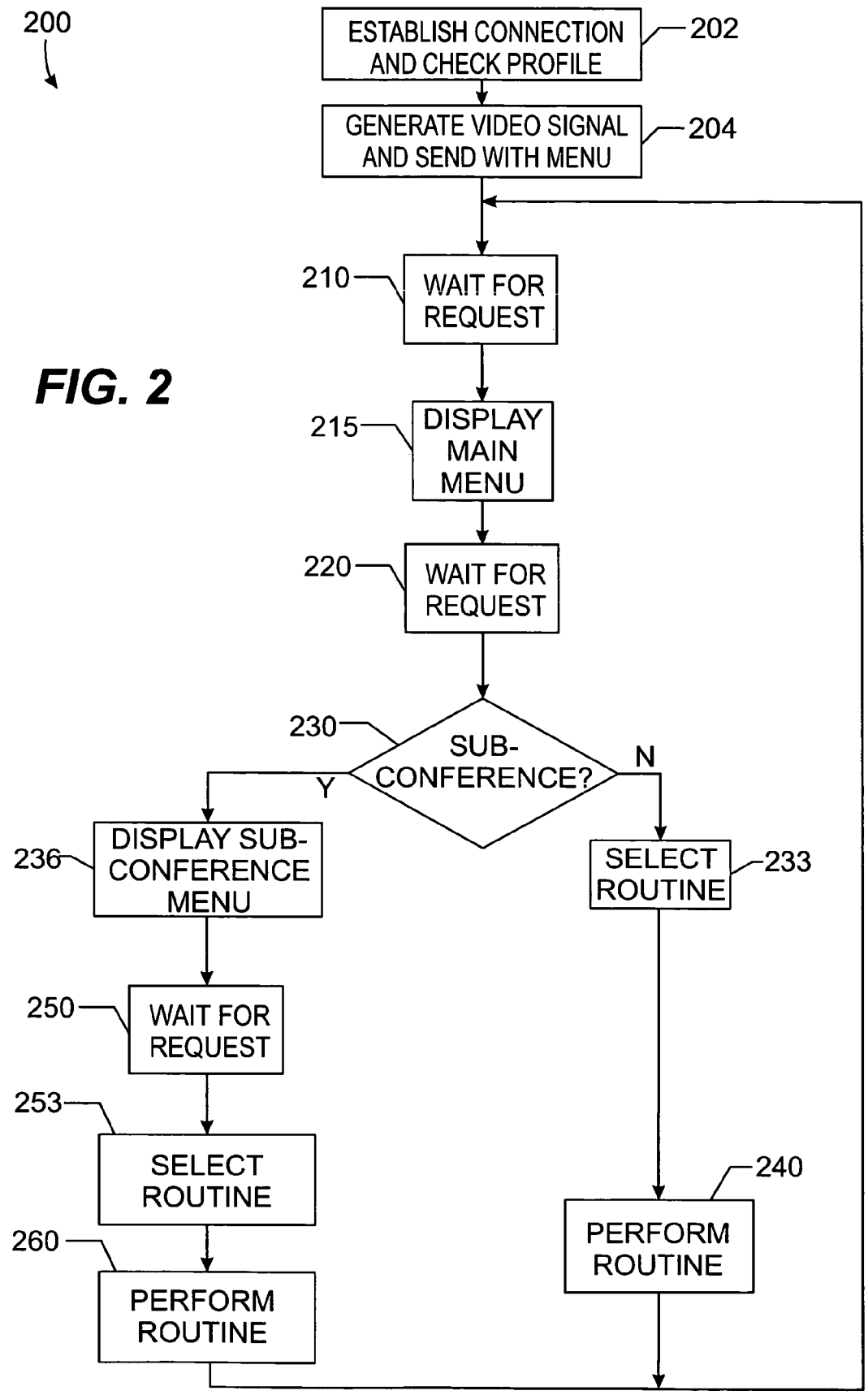
FIG. 2 is a flowchart showing an embodiment of a method for requesting a sub-conference according to the present disclosure.

FIG. 2 describes aspects of the requester mode of operation in further detail and in flow chart form, and specifically illustrates an embodiment of a method 200 for requesting a sub-conference while a main video videoconference is still ongoing. The steps of the method 200 can be performed by the control module (170; FIG. 1) of the MCU (140; FIG. 1). The method 200 is initiated as one of the initial tasks when establishing a connection with a participant of the main videoconference (Step 202). The profile of the main videoconference or the configuration of the MCU is checked to determine whether the participant will be able to request a sub-conference during the main videoconference. Based on the profile or the configuration, only some or all of the participants may be allowed to request sub-conferences.

In an exemplary embodiment of the present invention, in which the click and view option is used, then an indication (tab) for a menu is generated (312 FIG. 3) and sent to the participant's endpoint (Step 204). An exemplary menu screen is discussed below with reference to FIG. 3A. From this menu, the participant can request a main menu for requesting a sub-conference. At step 210, the method 200 waits for a request from the participant.

If a request is received at step 210, a main menu is generated and displayed to the requester (Step 215). If the requester is allowed to request a sub-conference the main menu may include, among others tabs, a tab for requesting a sub-conference. An exemplary main menu screen is discussed below with reference to FIG. 3B. From this main menu, the participant can select one of several options pertinent to the main conference; one of them is pertinent to request a sub-conference menu (tab 324B). The method 200 waits for a request from the participant (Step 220).

If a request is received at step 220, a determination is made at step 230 whether the request is for a sub-conference menu or for some other operation. If the request is not for a sub-conference menu, then the appropriate routine for the request is selected at step 233, and the routine is performed at step 240. Making the request, selecting the appropriate routine, and performing that routine may be performed by a click and view technique as disclosed in U.S. patent application Ser. No. 10/346,306, which is incorporated herein by reference in its entirety.

If the request at step 230 is for initiating a sub-conference menu, however, then a sub-conference menu is created and displayed at step 236 on the display screen 118 of the requester. An exemplary sub-conference menu is discussed below with reference to FIG. 3C. After displaying the sub-conference menu at step 236, the method 200 waits for a request related to the sub-conference (Step 250). If a request is received at step 250, the appropriate sub-conference routine is selected at step 253, and preformed at step 260. Exemplary routines are disclosed below in conjunction with screens 330, 350 and 360 of FIGS. 3C-3E. Ultimately, the method 200 runs in a looped operation as long as the participant is connected to the main videoconference. As one skilled in the art will recognize, the control module (170; FIG. 1) is capable of running a plurality of similar tasks in parallel depending on the number of participants connected to the MCU (140; FIG. 1).

Referring to FIGS. 3A-3E, exemplary menu screens for a requester to request a sub-conference and perform other routines related to sub-conferences are illustrated for the requester mode of operation.

Figure 3A:
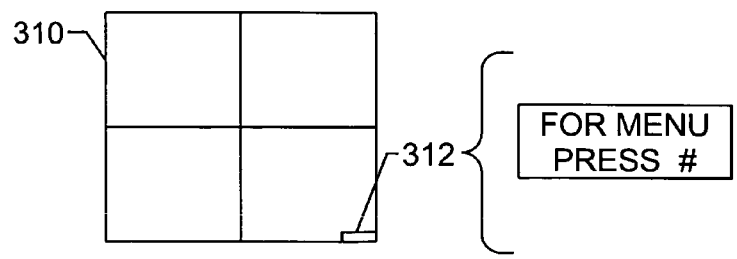
FIGS. 3A-3E illustrate exemplary screens for a requester of a sub-conference according to the present disclosure.

In FIG. 3A, a first screen 310, i.e., that is displayed at an endpoint of a given participant in a main videoconference, shows the ongoing main videoconference in accordance with a layout. In the present example, a 2×2 layout is used to show four segments, each of which might display the video images of four participants of the main videoconference for example. Of course, other layouts are possible, and a 2×2 layout is merely exemplary. A menu tab 312 is positioned at the bottom right corner of the screen 310 and is shown enlarged to the right of the screen 310 for easier viewing. The menu tab 312 instructs the participant to select a control signal (e.g., to push the "#" key on the control device of their endpoint) when they wish to access a main menu. It is understood that other control signals can be used depending of the type of endpoint used. Thus, reference to DTMF signals is only exemplary in the present disclosure.

Figure 3B:
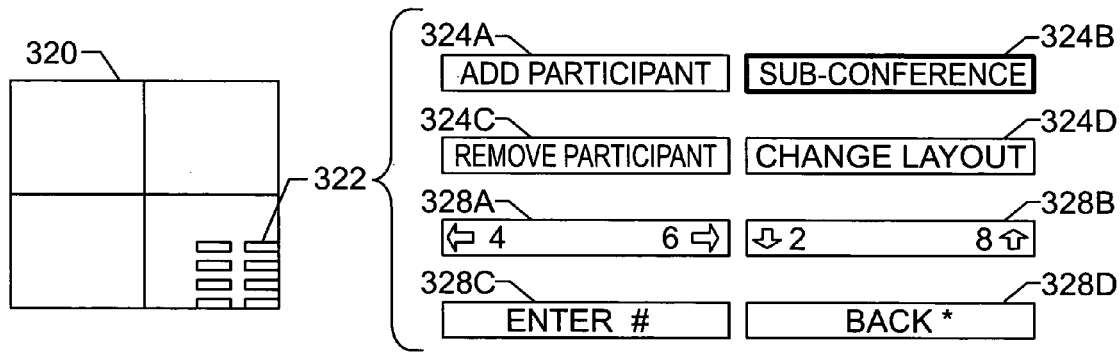

When the participant sends the control signal from their control device 112 (FIG. 1), the control module 170 receives the signal from the DTMF module 165 and instructs the menu generator 192 to generate a main menu 322, as shown in FIG. 3B. Specifically, the main menu 322 is submitted to the output module 196 for the requester via the common interface 198 of the video module 194. The output module 196 receives the menu from the menu generator 192, adds the menu to the composed video signal for the requester, compresses the composed video signal and menu, and transfers the compressed signal to the appropriate endpoint 110 of the requester for display.

The resulting second screen 320, as shown in FIG. 3B, shows the 2×2 layout of the main videoconference with the main menu 322, again shown enlarged to the right. The main menu 322 includes various function keys 324A-D for controlling the main conference including the option for requesting a sub-conference menu. Exemplary main conference control tabs may include, for example, a participant to the main-conference can be added (324A), removed (324C), or the layout of the main video conference can be changed (324D). Key 324B ultimately allows that sub-conference menu to be requested once selected. The main menu 322 can include additional function keys to control other parameters of the main-conference. For example, additional function keys can control the appearance of borders and background colors on the screen 320.

The participant can use the control device 112 (FIG. 1) at their endpoint to move a cursor to select between function keys 324A-D. Main menu 322 displays keys 328A-D to show the participant how to do this, and in the displayed example the keys 328A-D show the participant which DTMF keys to press at its endpoint to move the cursor ('4' for left, '6' for right, '2' for down, '8' for up, '#' for enter, '*' for returning to a previous menu). Of course, this is merely one way for instructing and allowing the participant to navigate through the displayed menus, and other schemes are possible, and will differ depending on the type of control device 112 being used (DTMF phone interface, computer keyboard or mouse, voice recognition methods, etc.).

As shown, key 324B is selected to allow the participant to request the sub-conference upon hitting enter ('#'). When the participant selects this key, a sub-conference menu 335 is generated and combined with output to the appropriate endpoint as described above, resulting in the screen 330 of FIG. 3C. Screen 330 again shows the 2×2 layout of the main videoconference with the sub-conference menu 335 shown superimposed thereon. The sub-conference menu 335 essentially allows the sub-conference to be defined and structured, and accordingly contains keys to allow certain participants to be invited to the sub-conference (336A), to define a subject of the sub-conference (336B), and to define the layout of the sub-conference (336D). Once the sub-conference has been structured using these keys, the sub-conference can be initiated using key 336C.

Figure 3C:
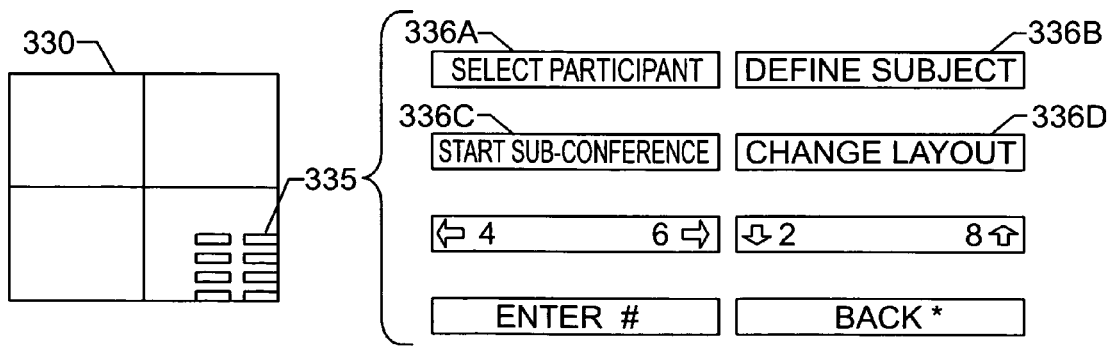

When the participant selects the "select participant" function key 336A from screen 330 of FIG. 3C, the menu generator 192 generates a new menu and layout for the requester and submits it to the requester's output module 196. The result is shown as selection screen 350 in FIG. 3D, which is presented to the requester's endpoint. The selection screen 350 shows the ongoing main videoconference in the 2×2 layout having the participants 353, 355, 357, and 359 of the main videoconference. However, numbers 352, 354, 356, and 358 are provided for each participant of the main videoconference. The selection screen 350 also has a selection submenu 382 to allow the requester to select one or more of the other participants to join the sub-conference. The selection submenu 382 informs the requester how to choose the various main videoconference participants for inclusion in the sub-conference. As shown, the submenu 382 invites the requester to choose a participant by selecting the appropriate number 352, 354, 356, and/or 358 for the corresponding participant. For example, the user would use his control device 112, in this case a DTMF phone pad, to press '1' to invite participant 357.

When the requester selects a participant to participate in the sub-conference, an appropriate control signal is sent to the control module 170 of the MCU 140 (FIG. 1). After receiving the control signal, the control module 170 in one embodiment can save the request and can instruct the menu generator 192 to regenerate the sub-conference menu 335 of FIG. 3C for the requester. Returning to the sub-conference menu 335 can then allow the requester to select additional participants for the sub-conference (key 336A), to define the subject of the sub-conference (key 336B), to define the layout (key 336C), or to start the sub-conference (key 336D).

Figure 3D:
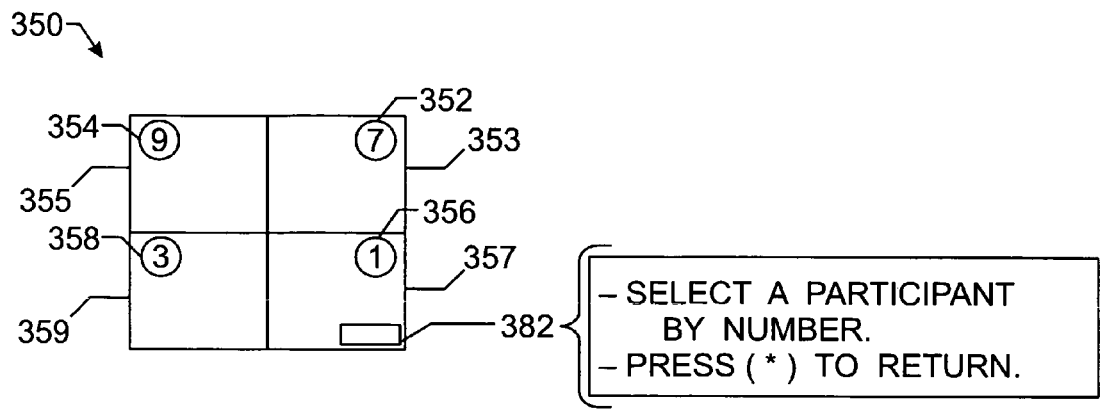

Other exemplary embodiments of the selection screen 350 of FIG. 3D can allow the requester to select more than one sub-conference participant at a time. For example, when the requester selects a participant by their number on the selection screen 350, that selected participant's number 352, 354, 356, or 358 may be highlighted and saved, and the requester can then select another participant using his control device. When the requester has selected all the desired participants for the sub-conference, the sub-menu 382 indicates that the requester can return to screen 330 of FIG. 3C by pressing '*'. Once the requester has returned to screen 330 of FIG. 3C, the requester can perform additional actions related to the sub-conference, such as define the subject of the sub-conference (key 336B), or the requester can actually initiate the sub-conference (key 336D). Other exemplary embodiments may display a list of participants names to be selected by the requester. Alternate embodiments may use predefine groups, etc.

In FIG. 3C, the "define subject" function key 336B starts a process to allow the requester to define the subject of the sub-conference. For example, when selected, an interactive voice recognition (IVR) session can be initiated, instructing the requester to record an invitation indicating the subject of the sub-conference and the names of the other participants (e.g., "Garret and Matthew, we need to speak off-line for a moment concerning the Q4 sales results."). Of course, other types of messages, such as text messages, can also be left by the requester, depending on the type of control devices 112 at the requester's disposal. Other exemplary embodiments may have pre define messages to be selected by the requester.

Figure 3E:
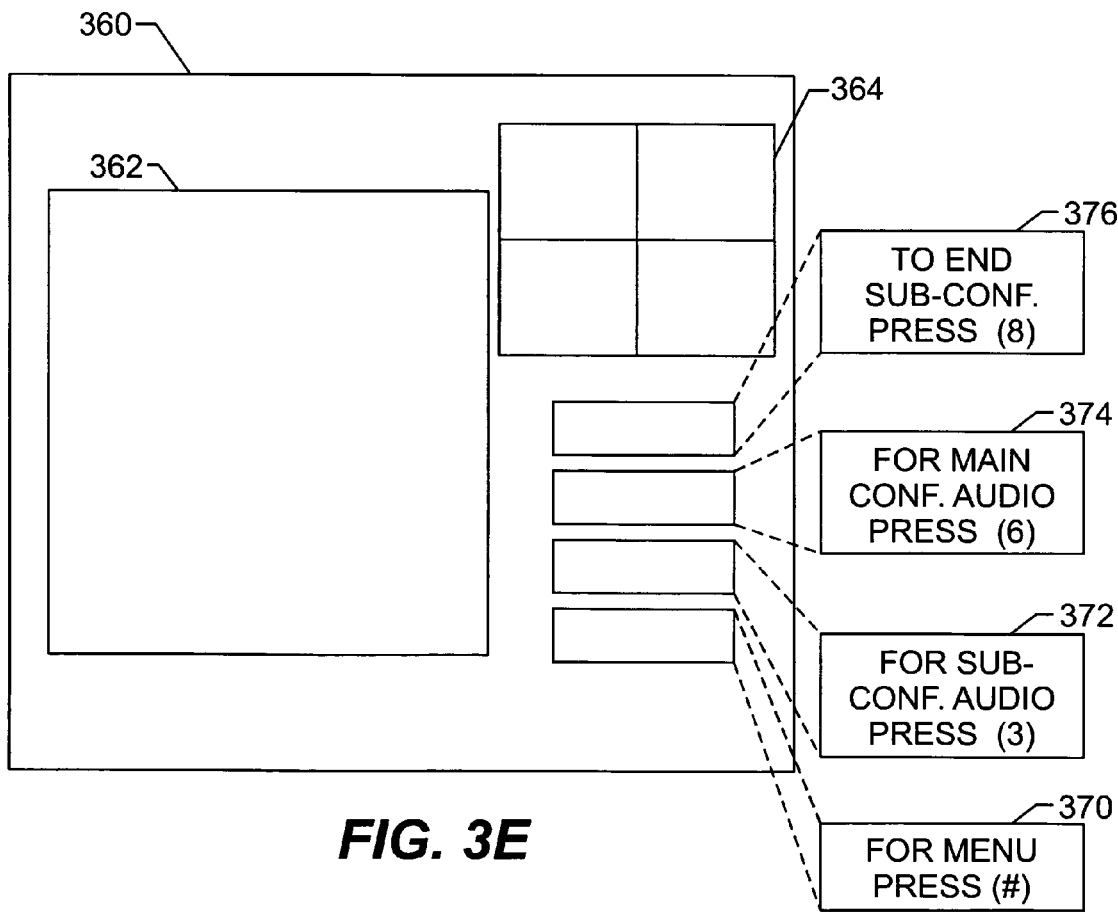

After selecting participants for the sub-conference and recording the subject as described above, the requester selects the "start" function key 336C from screen 330 of FIG. 3C to actually start the sub-conference. The result is shown in FIG. 3E, which shows sub-conference screen 360 presented at the requester's endpoint. The sub-conference screen 360 has a display region 362 for displaying sub-conference participant(s) and has a main videoconference display region 364 for displaying the ongoing main videoconference. In an alternate embodiment of the present invention, the image of an invite participate of a sub-conference may appears after accepting the invitation, for example. In the exemplary layout of screen 360, the display region 362 for the selected sub-conference participant(s) encompasses a larger portion of the screen 360 than the main videoconference region 364, but these sizes of these regions are relative and can be adjusted to user preferences.

Although not shown on the screen 360, the sub-conference display region 362 can have any form of layout depending on selections by the requester and the number of actual sub-conference participants. For example, if only one other participant is participating along with the requester in the sub-conference, only the other participant would be shown in the display region 362 at the requester's endpoint. If, however, two or more other participants are participating with the requester in the sub-conference, the display region 362 may be appropriately divided into a layout to accommodate video from each of the other participants.

Also on the screen 360, menu keys 370, 372, and 374 provide additional controls for the requester. For example, key 370 indicates that the requester can access the main menu (e.g., menu 322 of FIG. 3B) by pressing '#', which would allow the requester to perform various functions associated with the conference. Key 372 indicates that the requester can access audio of the sub-conference by pressing '3'. By accessing the audio of the sub-conference, the requester is able to speak and listen to other participants of the sub-conference without that audio being made available to the main videoconference that is still ongoing. (This option would be the default option upon first initialization of the sub-conference). By contrast, key 374 allows the requester to access the audio of the main videoconference by pressing '6,' such that the requester is able to speak and listen to the participants of the main videoconference. Thus, the requester may flip back and forth between the main videoconference and the sub-conference, and whichever is currently selected can be indicated by a visual cue present on the screen 360 (such as by use of a graphic or by highlighting and appropriate key 372 or 374). Of course, a key 376 can be provided for the requester to terminate the sub-conference.

Figure 4A:
FIGS. 4A-4C illustrate exemplary screens for participants invited to a sub-conference according to the present disclosure.

As noted above, the requester selects participants for the sub-conference. In one embodiment, the selected participant can be automatically connected to the sub-conference. In a preferred embodiment, however, the selected participants of the sub-conference are given an invitation to the sub-conference and an opportunity to accept or deny the invitation. FIG. 4A shows an invitation screen 400 for display at the endpoint of a selected sub-conference participant. The invitation screen 400 has the layout of the ongoing main videoconference, but an invitation menu 410, shown enlarged for illustrative purposes, is included on the screen 400. This invitation menu 410 can be generated when the requester either selects the participant or starts the actual sub-conference. As before, generating the invitation menu 410 and transferring it along with the main videoconference layout requires the menu generator 192 of FIG. 1 to generate the invitation menu 410 and to send it to the appropriate output modules 196 for output to the endpoint of the selected participant(s).

The invitation menu 410 can be navigated by the selected participant using click and view schemes disclosed earlier. As shown, the menu 410 includes an invitation 412 instructing the selected participant that they have been invited to join a sub-conference. The invitation menu 410 also provides two options 420 and 422 for the selected participant to accept or deny the invitation 412. In addition to the invitation 412, the invitation menu 410 can provide details 424 of the other selected participants and the requester of the sub-conference from the profiles stored with the MCU. Furthermore, the invitation menu 410 can provide information 426 about the sub-conference entered by the requester. For example, by selecting the information 426, the message concerning the subject of the sub-conference that was input with key 336B of FIG. 3C can be played or displayed to the selected participant.

When receiving the responses of the selected participant, the control module 170 of FIG. 1 proceeds accordingly. For example, the control module 170 can instruct the video unit 194 to create a layout that fits the sub-conference requirements and to send it to the requester's endpoint who initiated the sub-conference. In parallel, the audio unit 160 of FIG. 1 is instructed to mix the audio of the sub-conference and to transfer it to the sub-conference participants to allow them to participate in the sub-conference.

Figure 4B:
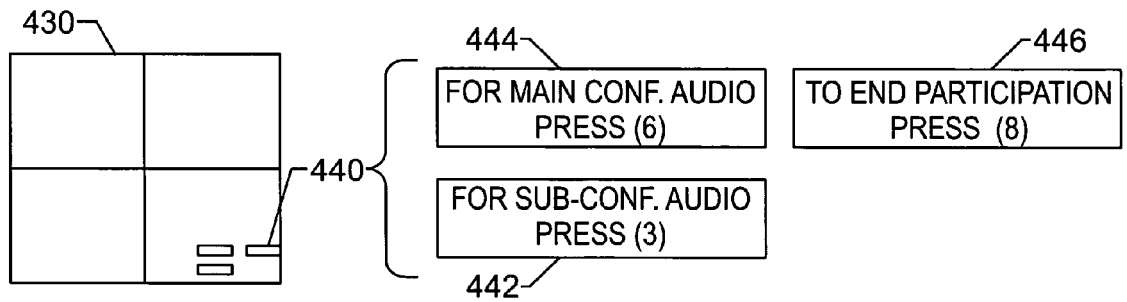

In one embodiment, the selected participants who have accepted the invitation to the sub-conference are able to view only the ongoing main videoconference and are able to choose between audio of the main videoconference and the sub-conference. As shown in FIG. 4B, a sub-conference screen 430 presented to the sub-conference participants endpoint has the existing layout of the ongoing main videoconference. The screen 430 also has a sub-menu 440, which allows the participant to select between audio of the main videoconference (key 442) or audio of the sub-conference (key 444). Thus, the participant may flip back and forth between the main videoconference and the sub-conference, and whichever is currently selected can be indicated by a visual cue present on the screen 440 (such as by use of a graphic or by highlighting and appropriate key 442 or 444). Of course, a key 446 can be provided for the selected participant to end their participation in the sub-conference.

Figure 4C:
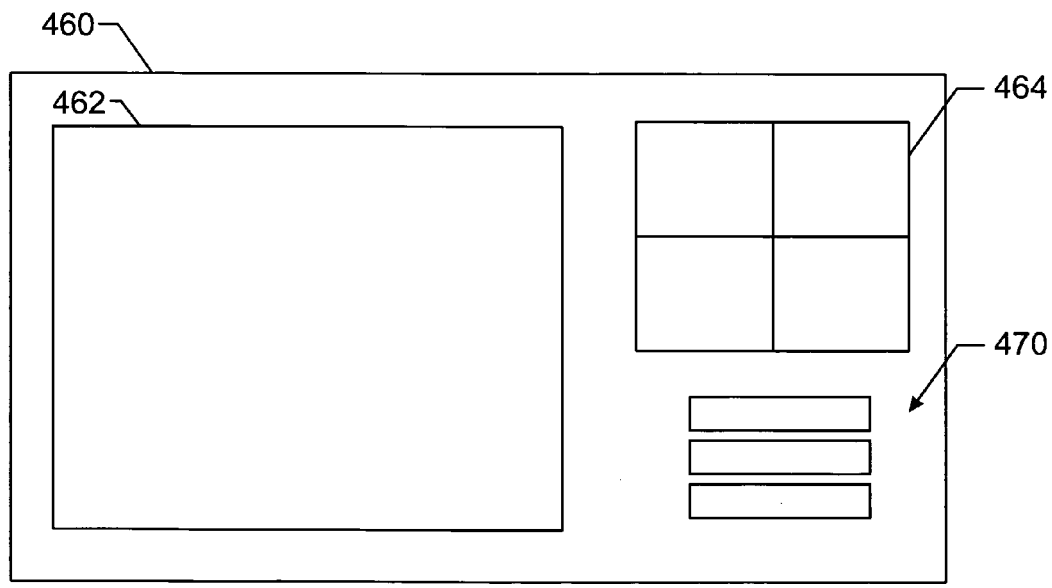

In another embodiment, the selected participant who has accepted the invitation to the sub-conference is able to view the ongoing main videoconference along with video of the sub-conference and is able to choose between audio of the main videoconference and the sub-conference. As shown in FIG. 4C, a sub-conference screen 460 for the selected participant can be similar to that available to the requester of the sub-conference (e.g., screen 360 of FIG. 3E). Accordingly, the screen 460 has a display region 462 for displaying sub-conference participant(s) and has a main videoconference display region 464 for displaying the ongoing main videoconference. In the sub-conference display region 462, the selected participant is allowed to view video of the other participants and the requester of the sub-conference. A plurality of menu keys 470 are provided on the screen 460. As before, these keys 470 indicate that the participant can switch between audio of the sub-conference and the audio of the main videoconference, in much the same way the requester is allowed in screen 350 of FIG. 3E. In addition, the keys 470 can indicate that the participant can end their participation in the sub-conference.

In another exemplary embodiment of the present invention, the sub-conference audio and the main conference audio may be mixed. The mixed audio may be delivered to the sub-conference participants. Different gain may be set to the audio of main-conference and to the audio of the sub conference.

As noted above, the system of the present disclosure is capable of operating according to a "traveler mode" of operation in which a "traveler" is capable of "traveling" or selecting between two or more associated videoconferences. Although the traveler mode of operation was described briefly above, discussion now turns to a more detailed description of this mode of operation.

Figure 5A:
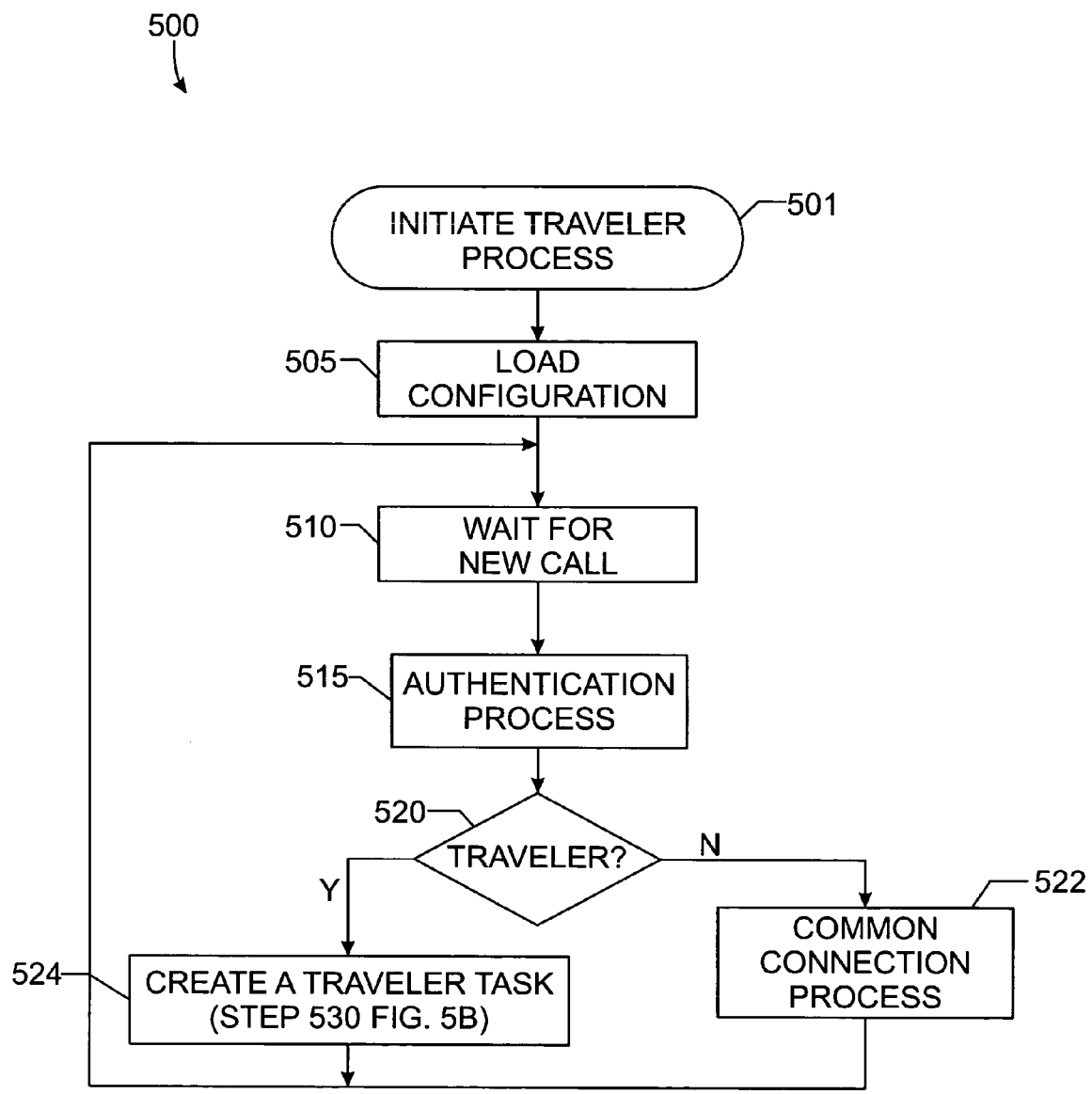
FIGS. 5A-5B illustrate flowcharts showing steps of an embodiment of a method for managing associated videoconferences according to the present disclosure.
Figure 5B:
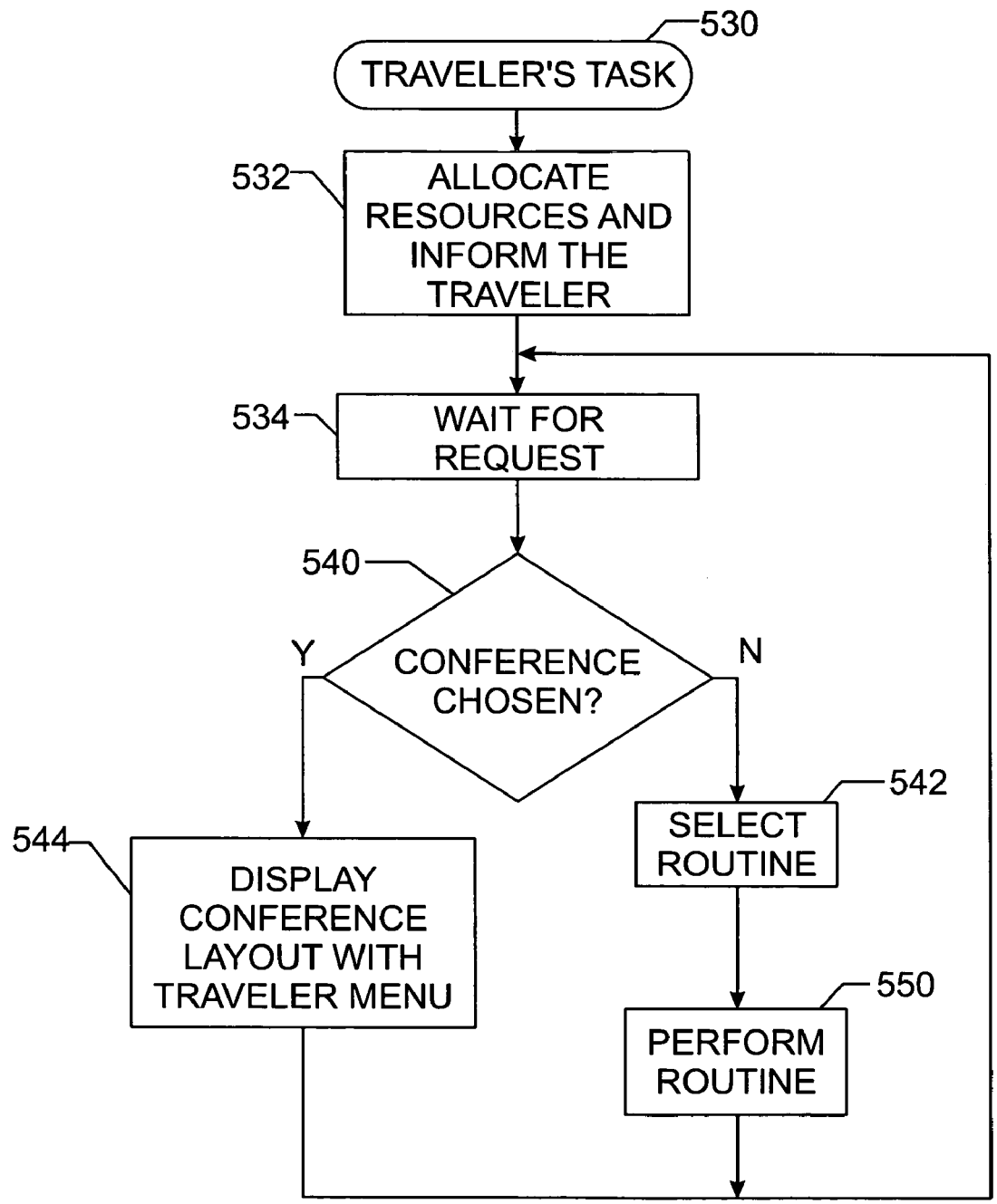
Figure 6A:
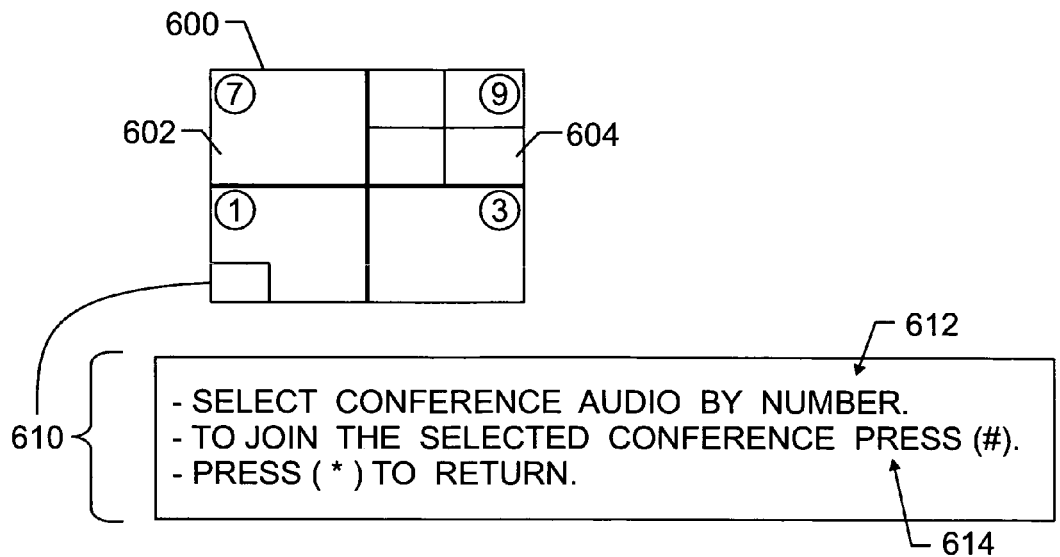
FIGS. 6A-6B illustrate exemplary screens for a traveler to manage associated videoconferences.
Figure 6B:
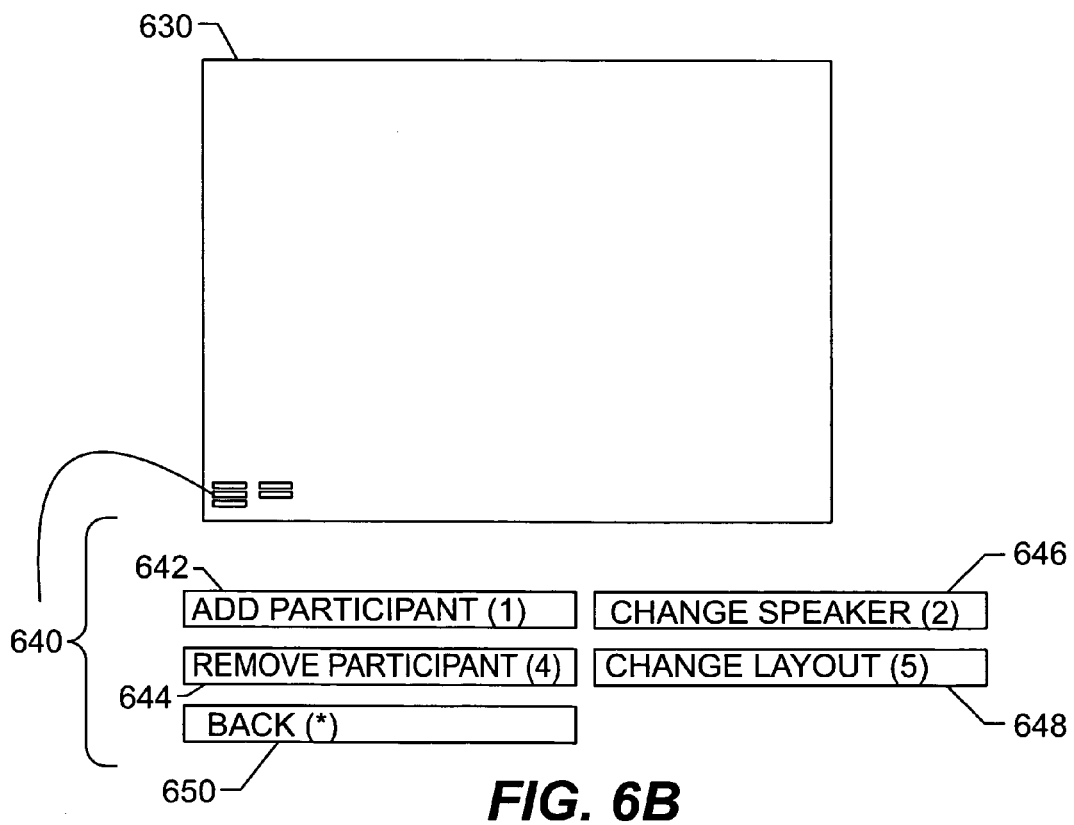

FIGS. 5A and 5B show a flow chart of an embodiment of a method 500 for managing associated videoconference and performing other routines related to associated videoconferences, and exemplary screens illustrating these techniques are shown in FIGS. 6A-6B, to be discussed shortly. The method 500 is performed by the control module (170; FIG. 1), uses a click and view technique or application discussed previously to control the MCU. However, it is understood that other exemplary embodiments of the method 500 can use other communication techniques to inform and control the MCU.

When engaged, e.g., when the control module 170 is powered, the method 500 is initiated at step 501 as one of the tasks associated with the control module. When initiated, the configuration of the MCU is loaded (Step 505), which includes, among other parameters, profiles of the videoconferences assigned with the MCU and information about one or more associations of videoconferences. Each association can include two or more videoconferences, and each videoconference can be defined by a separate dial-in number, address, personal ID number (PIN), etc. Furthermore, each association can include one or more traveling participants ("travelers"), who are allowed to view, hear, join, and control the associated videoconferences. A traveler can be defined by a dial in number, a password, a user name, a caller ID, etc., recognizable by the control unit 170. For example, a particular association of videoconferences can belong to a certain organization and the travelers can be the managers of the organization. The traveler can access the associated videoconferences with a special dial-in number that is separate from other participants.

After the parameters are stored at step 505, method 500 waits for a new call at step 510. More information about methods for joining a videoconference are disclosed in U.S. patent application Ser. Nos. 09/790,577 and 10/960,337, which are both incorporated herein by reference.

When a new call is received at step 510, an authentication process is invoked at step 515. The authentication process can be based on: dial-in number of the caller, user name, password from the caller, and voice recognition. If desired, requesting the user name and password can be done by an IVR session or by a click and view technique, for example. Based on the parameters that were stored from the configuration and/or profiles at step 505, a determination is made at step 520 whether the caller is a regular participant of one of the associated videoconferences or whether the caller is a traveler.

If the new caller is determined to be a regular participant at step 520, a common connection process is used to connect the caller to the appropriate videoconference (Step 522) as is well known, and the method 500 returns to step 510 to look for the next new caller. In embodiments of step 522, the caller who is a regular participant is connected to the videoconference based only on the dial in number, but the MCU may also request a videoconference ID number from the caller to define the appropriate videoconference, which is assigned to a videoconference when the videoconference is reserved. Requesting the videoconference ID number can be done by an IVR session or by a click and view technique, voice recognition, electronic message, etc. Other exemplary embodiments of the present invention may automatically identify the traveler by recognizing his address ("Caller ID"). The caller ID depends on the type of communication used. For example, the caller ID can be the caller's telephone number, ISDEN number, IP address, etc.

If the new caller is determined to be a traveler at step 520, then a traveler task is initiated at step 524, and the method 500 returns to step 510 to look for the next new caller. Establishing the connection of the new traveler is disclosed below in conjunction with steps 530 to 570 in FIG. 5B and can continue in parallel with steps 510-520 of FIG. 5A. Each traveler task can be associated with one traveler. Two or more traveler tasks can run in parallel by the control module 170.

As just noted, FIG. 5B illustrates the task for establishing the connection of a traveler. After initiation at step 530, the traveler task allocates video input and output modules and audio resources (audio ports) for the traveler (Step 532). Then, the traveler is informed at step 532 about the currently running videoconferences belonging to the association. Informing the traveler can be done by several ways. In one embodiment where a click and view technique is used, the menu generator (192; FIG. 1) generates a traveler menu. An exemplary traveler menu is illustrated and discussed below with reference to FIG. 6A. Other embodiments may use an IVR session, voice recognition, electronic message, etc.

After informing the traveler at step 532, the traveler task awaits a request from the traveler at step 534. When a request is received at step 534, a determination is made at step 540 whether the traveler has selected to participate in one of the associated videoconferences. If the traveler has requested some other operation, then the appropriate routine is selected at step 542 depending on the received request, and the control module (170; FIG. 1) performs the selected routine at step 550. For example, if the received request was a DTMF symbol for changing how the associated videoconferences are displayed, the layout can be changed by the appropriate routine. After performing the routine, the traveler task returns to step 534 and waits for the next request.

If the traveler selects to participate in one or more of the videoconferences at step 540, then the video and the audio resources associated with the traveler are instructed at step 544 to collect, process, and deliver the video and the audio relevant to the selected videoconference to the traveler's endpoint. The traveler can have the option to be active or passive in the selected videoconferences. If the traveler decides to be active, then the video and the audio resources of the participants of the selected videoconferences are instructed to add the traveler's audio and video to the selected videoconferences.

As noted above, the traveler is allowed to join one or more of the associated videoconferences. Referring to FIG. 6A, an exemplary traveler screen 600 is illustrated. In a screen-share mode of operation, for example, the traveler screen 600 shows all the associated videoconferences that are currently running. In this screen-shared mode, the video output module associated with the traveler is instructed to create an association layout divided into segments 602. Four segments 602 are shown in the example of FIG. 6A, and each segment 602 is associated with one of the running videoconferences. Each segment 602 can show images of all the participants connected to that videoconference (as with segment 604). In addition, each segment 602 can show the current speaker of that videoconference, can show the layout that is the most popular among the participants of that videoconference, etc.

Each segment 602 in the layout has an identification number (e.g., videoconferences 1, 3, 7, and 9). An exemplary instruction menu 610, generated by the menu generator 192 and shown as enlarged for illustrative purposes, informs the traveler how to route the audio of a videoconference or all of them or subset of them to his audio port (instruction 612) and how to join a selected one or more videoconference (instruction 614). Using the control device at his endpoint, the traveler can use the click and view techniques disclosed herein to make a request from the instruction window 610. Other exemplary embodiment of the present invention may use an application that runs over a personal computer (PC), a PDA or on any other computing device that can communicate with the MCU.

In contrast to the screen-share mode, the traveler screen 600 can use a time-share mode of operation to display the videoconferences belonging to the association. In this mode (not shown in the figures), the video output module and the audio port can temporarily be assigned to one of the videoconferences, e.g. videoconference '1', for a certain time period. During that time period, the traveler sees a layout of videoconference '1' and listens to the speaker of that videoconference. The traveler menu generator 192 displays the instruction menu 610 and the identification number '1' which the traveler may select. At the end of the time period, the video output module and the audio port are assigned to another videoconference '3' for a period of time, to videoconference '9' for a period of time, and to videoconference '7' for a period of time, each displaying the appropriate identification number to allow the traveler to select to join the videoconference of his choice. At the end of displaying the last videoconference '7', the cycle can start again until a request is received from the traveler. In yet another embodiment, the traveler screen 600 can use both the screen-share and time-share modes and can allow the traveler to choose from one of them.

Once the traveler has joined an associated videoconference by following instruction 614 on menu 610, the traveler can control that selected videoconference in accordance with a traveler menu 640 as displayed in FIG. 6B. In FIG. 6B, the joined videoconference is shown fully on the traveler's screen 630. Additionally, the traveler menu 640, again generated by the menu generator 192, is shown superimposed on the screen 630. The traveler menu 640 has various options relevant to controlling and navigating through the joined videoconference, including: a selection 650 to return to the association layout again (screen 600 FIG. 6A); a selection 648 for changing the layout of associated videoconference; selections 642, 644 to add or remove a participant; a selection 646 to change the speaker, etc. If the traveler selects to join two or more conferences, then the traveler may define which combination of audio and/or video will be presented to him. In the present example, the traveler selects these various options by pressing an appropriate key (e.g., '1,' '2,' '4,' or '5') using his control device 112.

Although making requests and/or selections are accomplished using the click and view technique of U.S. patent application Ser. No. 10/346,306, which is incorporated herein by reference in its entirety. Other exemplary embodiment of the present invention can use other techniques for informing the traveler. For example, the other techniques can include text menus, graphical menus with shapes that include key icons to be selected, vocal messages defining different options to be selected by the user, etc. The selection of the user can be done by various signaling techniques including, but not limited to DTMF, Far End Camera Control, voice recognition, etc. Other exemplary embodiment of the present invention can use an application that runs over a personal computer (PC), a PDA or on any other computing device that can communicate with the MCU.

In another exemplary embodiment of the present invention, requests and selections may be accomplished over logical channels that may carry the data (i.e., audio and video) between the MCU and the endpoints, which may be accomplished using communication protocols such as but not limited to "instant message," SMS, TCP/IP, H.323, etc. Or, the requests and selections can occur using pathways different from the logical audio/video channels, such as through the internet, by instant message, SMS, e-mail etc. The means used to send such instructions can comprise a device different from the user's normal endpoint control device 112, and may constitute for example a Personal Data Assistant (PDA), a cell phone, a separate computer, etc. The MCU and the participants can share a chat room for communicating requests, for example. In any event, the MCU may have an API (Application Program Interface) module and/or a web server for interfacing between the MCU and the instruction method. Use of a web server to inform and control and MCU is disclosed in U.S. Pat. No. 6,760,750, which is incorporated herein by reference.

When instant messaging or similar scheme are used to communicate a request or selection to the MCU, the participants and the MCU can be connected over the Internet, and the participants and the MCU use an instant message service. Such instant messaging would include the appropriate fields needed to define a sub-conference, as disclosed herein. For example, fields can be provided to define the participants in a sub-conference, to define the subject, and to define the sub-conference layout. The MCU, using an API module, collects the instant messaging information, and processes them to instruct the audio module 160 and the video module 194 to perform according to the request.

Those skilled in the art will appreciate that the present invention can be implemented in the form of additional software residing in the MCU for performing the methods disclosed herein, or additional hardware added to the MCU, or additional software or hardware distributed among the MCU and the videoconference terminals. It will be appreciated that the above-described methods may be varied in many ways. It should also be appreciated that the above description of methods and systems are to be interpreted as including apparatus for carrying out the methods and methods of using the apparatus.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

In the present disclosure, the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware The described embodiments comprise different features, not all of which are required in all embodiments of the invention. Some embodiments of the present invention utilize only some of the features or possible combinations of the features. Different combinations of features noted in the described embodiments will occur to persons skilled in the art. The scope of the invention is limited only by the following claims.

What is claimed is:

1. A method implementable with a multipoint control unit for conducting a plurality of videoconferences between a plurality of endpoints, comprising:
   conducting a main videoconference between a group of endpoints;
   receiving a request from a requesting endpoint, which belongs to the group of endpoints, to conduct a sub-videoconference with less than all of the endpoints of the group, the request identifying one or more selected endpoints of the less than all of the endpoints of the group to participate in the sub-videoconference;
   sending an invitation to each of the one or more selected endpoints to join the requesting endpoint in the sub-videoconference;
   receiving one or more responses to the invitations from the one or more selected endpoints;
   while the main videoconference is still pending, establishing the sub-videoconference between the requesting endpoint and the one or more selected endpoints of the group responding affirmatively to the invitation; and
   after establishing the sub-videoconference, allowing the endpoints participating in the sub-videoconference to actively select either (a) to listen to the audio of the main videoconference only or mixed with the audio of the sub-videoconference and (b) to listen only to the audio of the sub-videoconference.

2. The method of claim 1, further comprising, after establishing the sub-videoconference, allowing an endpoint participating in the sub-videoconference to choose between participation in the main videoconference or the sub-videoconference.

3. The method of claim 1, further comprising, after establishing the sub-videoconference, composing video coming from the less than all of the endpoints of the group into sub-videoconference video according to a sub-videoconference layout, wherein the layout includes a first region having video of the main videoconference and includes a second region having the sub-videoconference video.

4. The method of claim 1, wherein establishing the sub-videoconference comprises preventing audio from the endpoints participating in the sub-videoconference to be broadcast to all of the endpoints participating in the main videoconference.

5. The method of claim 1, wherein establishing the sub-videoconference comprises preventing video from the endpoints participating in the sub-videoconference to be broadcast to all of the endpoints participating in the main videoconference.

6. The method of claim 1, wherein the main videoconference and the sub-videoconference are both visible to the endpoints participating in the sub-videoconference after establishing the sub-videoconference.

7. The method of claim 1, wherein the request comprises at least one DTMF tone.

8. The method of claim 1, wherein the request is sent in-band over logical channels that carry the audio and video.

9. The method of claim 1, wherein the request is sent out of band over pathways different from the audio/video channels.

10. The method of claim 1, wherein the request and the invitation are accompanied by a sub-videoconference subject obtainable by the one or more selected endpoints.

11. The method of claim 1, further comprising allowing the endpoints participating in the sub-videoconference to rejoin the main videoconference after the sub-videoconference is completed.

12. A multipoint control unit for conducting a plurality of videoconferences between a plurality of endpoints, comprising:
    a control module, wherein the control module is configured to:
    conduct a main videoconference between a group of endpoints;
    receive a request from a requesting endpoint, which belongs to the group of endpoints, to conduct a sub-videoconference with less than all of the endpoints of the group, the request identifying one or more selected endpoints of the less than all of the endpoints of the group to participate in the sub-videoconference;
    send an invitation to each of the one or more selected endpoints to join the sub-videoconference;
    receive one or more responses to the invitations from the one or more selected endpoints;
    while the main videoconference is still pending, establish the sub-videoconference between the requesting endpoint and the selected one or more endpoints of the group responding affirmatively to the invitation; and
    allow the endpoints participating in the sub-videoconference to actively select either (a) to listen to the audio of the main videoconference only or mixed with the audio of the sub-videoconference and (b) to listen only to the audio of the sub-videoconference.

13. The multipoint control unit of claim 12, wherein the control module is further configured, after establishing the sub-videoconference, to allow an endpoint participating in the sub-videoconference to choose between participation in the main videoconference or the sub-videoconference.

14. The multipoint control unit of claim 12, wherein the control module is further configured, after establishing the sub-videoconference, to compose video coming from the less than all of the endpoints of the group into a sub-videoconference video according to a sub-videoconference layout, wherein the layout includes a first region having video of the main videoconference and includes a second region having the sub-videoconference video.

15. The multipoint control unit of claim 12, wherein the control module is further configured to prevent audio from the endpoints participating in the sub-videoconference to be broadcast to all endpoints participating in the main videoconference.

16. The multipoint control unit of claim 12, wherein the control module is further configured to prevent video from the endpoints participating in the sub-videoconference to be broadcast to all endpoints participating in the main videoconference.

17. The multipoint control unit of claim 12, wherein the control module is further configured to display the main videoconference and the sub-videoconference together to the endpoints participating in the sub-videoconference after establishing the sub-videoconference.

18. The multipoint control unit of claim 12, wherein the request comprises at least one DTMF tone.

19. The multipoint control unit of claim 12, wherein the request is sent in-band over logical channels that carry the audio and video.

20. The multipoint control unit of claim 12, wherein the request is sent out of band over pathways different from the audio/video channels.

21. The multipoint control unit of claim 12, wherein the request and the invitation are accompanied by a sub-videoconference subject obtainable by the one or more selected endpoints.

22. The multipoint control unit of claim 12, wherein the control module is further configured to allow the endpoints participating in the sub-videoconference to rejoin the main videoconference after the sub-videoconference is completed.

23. A method implementable with a multipoint control unit for conducting a plurality of videoconferences between a plurality of endpoints, comprising:
   conducting a main videoconference between a group of endpoints;
   receiving a request from a requesting endpoint, which belongs to the group of endpoints, to conduct a sub-videoconference with less than all of the endpoints of the group, the request identifying one or more selected endpoints of the less than all of the endpoints of the group to participate in the sub-videoconference;
   sending an invitation to each of the one or more selected endpoints to join the requesting endpoint in the sub-videoconference;
   receiving one or more responses to the invitations from the one or more selected endpoints; and
   while the main videoconference is still pending, establishing the sub-videoconference between the requesting endpoint and the one or more selected endpoints of the group responding affirmatively to the invitation,
   wherein the main videoconference and the sub-videoconference are both visible to the endpoints participating in the sub-videoconference after establishing the sub-videoconference.

24. The method of claim 23, further comprising, after establishing the sub-videoconference, allowing an endpoint participating in the sub-videoconference to choose between participation in the main videoconference or the sub-videoconference.

25. The method of claim 23, further comprising, after establishing the sub-videoconference, composing video coming from the less than all of the endpoints of the group into sub-videoconference video according to a sub-videoconference layout, wherein the layout includes a first region having video of the main videoconference and includes a second region having the sub-videoconference video.

26. The method of claim 23, wherein establishing the sub-videoconference comprises preventing audio from the endpoints participating in the sub-videoconference to be broadcast to all of the endpoints participating in the main videoconference.

27. The method of claim 23, wherein establishing the sub-videoconference comprises preventing video from the endpoints participating in the sub-videoconference to be broadcast to all of the endpoints participating in the main videoconference.

28. The method of claim 23, further comprising, after establishing the sub-videoconference, allowing the endpoints participating in the sub-conference to actively select either (a) to listen only to the audio of the main videoconference, (b) to listen to the audio of the main videoconference mixed with the audio of the sub-videoconference, and (c) to listen only to the audio of the sub-videoconference.

29. The method of claim 23, wherein the request comprises at least one DTMF tone.

30. The method of claim 23, wherein the request is sent in-band over logical channels that carry the audio and video.

31. The method of claim 23, wherein the request is sent out of band over pathways different from the audio/video channels.

32. The method of claim 23, wherein the request and the invitation are accompanied by a sub-videoconference subject obtainable by the one or more selected endpoints.

33. The method of claim 23, further comprising allowing the endpoints participating in the sub-videoconference to rejoin the main videoconference after the sub-videoconference is completed.

34. A multipoint control unit for conducting a plurality of videoconferences between a plurality of endpoints, comprising:
   a control module, wherein the control module is configured to:
      conduct a main videoconference between a group of endpoints;
      receive a request from a requesting endpoint, which belongs to the group of endpoints, to conduct a sub-videoconference with less than all of the endpoints of the group, the request identifying one or more selected endpoints of the less than all of the endpoints of the group to participate in the sub-videoconference;
      send an invitation to each of the one or more selected endpoints to join the sub-videoconference;
      receive one or more responses to the invitations from the one or more selected endpoints;
      while the main videoconference is still pending, establish the sub-videoconference between the requesting endpoint and the selected one or more endpoints of the group responding affirmatively to the invitation; and
      display the main videoconference and the sub-videoconference together to the endpoints participating in the sub-videoconference after establishing the sub-videoconference.

35. The multipoint control unit of claim 34, wherein the control module is further configured, after establishing the sub-videoconference, to allow an endpoint participating in the sub-videoconference to choose between participation in the main videoconference or the sub-videoconference.

36. The multipoint control unit of claim 34, wherein the control module is further configured, after establishing the sub-videoconference, to compose video coming from the less than all of the endpoints of the group into a sub-videoconference video according to a sub-videoconference layout, wherein the layout includes a first region having video of the main videoconference and includes a second region having the sub-videoconference video.

37. The multipoint control unit of claim 34, wherein the control module is further configured to prevent audio from the endpoints participating in the sub-videoconference to be broadcast to all endpoints participating in the main videoconference.

38. The multipoint control unit of claim 34, wherein the control module is further configured to prevent video from the endpoints participating in the sub-videoconference to be broadcast to all endpoints participating in the main videoconference.

39. The multipoint control unit of claim 34, wherein the control module is further configured to allow the endpoints participating in the sub-conference to actively select either (a)

to listen only to the audio of the main videoconference, (b) to listen to the audio of the main videoconference mixed with the audio of the sub-videoconference, and (c) to listen only to the audio of the sub-videoconference.

40. The multipoint control unit of claim 34, wherein the request comprises at least one DTMF tone.

41. The multipoint control unit of claim 34, wherein the request is sent in-band over logical channels that carry the audio and video.

42. The multipoint control unit of claim 34, wherein the request is sent out of band over pathways different from the audio/video channels.

43. The multipoint control unit of claim 34, wherein the request and the invitation are accompanied by a sub-videoconference subject obtainable by the one or more selected endpoints.

44. The multipoint control unit of claim 34, wherein the control module is further configured to allow the endpoints participating in the sub-videoconference to rejoin the main videoconference after the sub-videoconference is completed.

* * * * *